FREQUENCY DOUBLER

Filed Jan. 6, 1967

Raymond A. Brandt
Loren L. Dickerson,
INVENTORS.

BY Harry M. Saragovitz
Edward J. Kelly
Herbert Berl
Aubrey J. Dunn

United States Patent Office 3,448,387

Patented June 3, 1969

3,448,387
FREQUENCY DOUBLER

Raymond A. Brandt and Loren L. Dickerson, Huntsville, Ala., assignors to the United States of America as represented by the Secretary of the Army Filed Jan. 6, 1967, Ser. No. 607,861
Int. Cl. H03b *19/14*
U.S. Cl. 328—20 8 Claims

ABSTRACT OF THE DISCLOSURE

A frequency doubler is disclosed. One embodiment of the invention uses a special flip-flop with differentiators feeding an input signal into the flip-flop, and with a reset feedback path having a time delay. The flip-flop has "pre-set" and "pre-reset" input terminals, as well as the usual output terminals and usual "set" and "reset" input terminals. Another embodiment of the invention uses two of the special flip-flop cascade, and does not employ differentiators. A logical network is used at the input to one of the flip-flops.

There are many known ways of doubling the frequency of a periodic wave. One way is by the use of an amplifier tuned to a harmonic of a square-wave input. In order to double the frequency of a sine wave by this technique, the sine wave must first be converted to a square wave. Only one frequency could be doubled, because of the tuned circuit.

One embodiment of the invention uses a special flip-flop with differentiators feeding an input signal into the flip-flop, and with a reset feedback path having a time delay. While this embodiment does double the frequency of input waves, it is dependent, because of the differentiators, both on the frequency and wave shape of the input waves. The particular flip-flop employed has "set" and "pre-set" inputs. The differentiators differentiate the leading and trailing edges of a square-wave input to give short pulses. These pulses are applied alternately to the "set" and "pre-set" inputs of the flip-flop, and either of the pulses causes it to go into a "set" condition, if it is in a "reset" condition. The time-delay feedback of the flip-flop feeds back the output of the flip-flop and resets the flip-flop for each output pulse. Thus, the flip-flop is in a "reset" condition when the pulses from the differentiators are applied to either the "set" or "pre-set" inputs.

The preferred embodiment of the invention uses two cascaded special flip-flops, and does not employ differentiators. The elimination of differentiators allows this embodiment to operate independent of frequency or wave shape. A logical network is used at the input to one of the special flip-flops.

An object of this invention is to provide a novel frequency doubler.

Another object is to provide a frequency doubler which is usable over a wide range of frequencies.

Yet another object is to provide a frequency doubler employing logical circuits.

These ojects, and other which may be obvious to one skilled in the art, may be realized by the invention as described hereinafter, and as shown in the drawing, in which.

Figure 1:
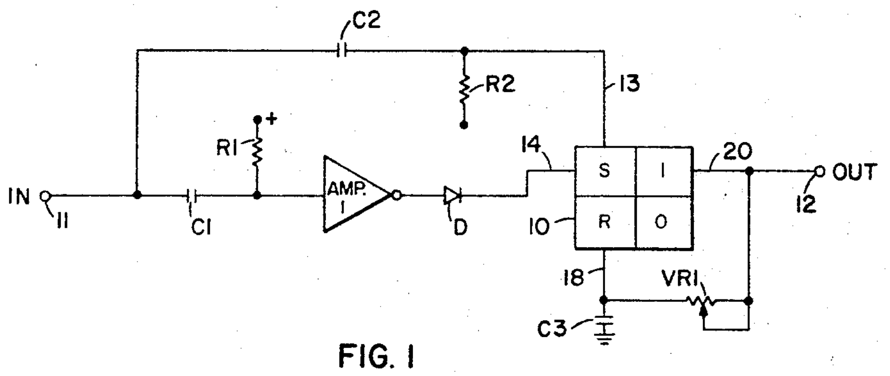
FIGURE 1 shows, in schematic form, a simple embodiment of the invention.

Referring now to FIGURE 1, numeral 10 designates a special flip-flop. This flip-flop has a "set" input as 14 and a "pre-set" input as 13, a "pre-reset" input at 18, and a "set" output as 20. An explanation of FIGURE 3 at this point will aid in understanding FIGURES 1 and 2.

Figure 3:
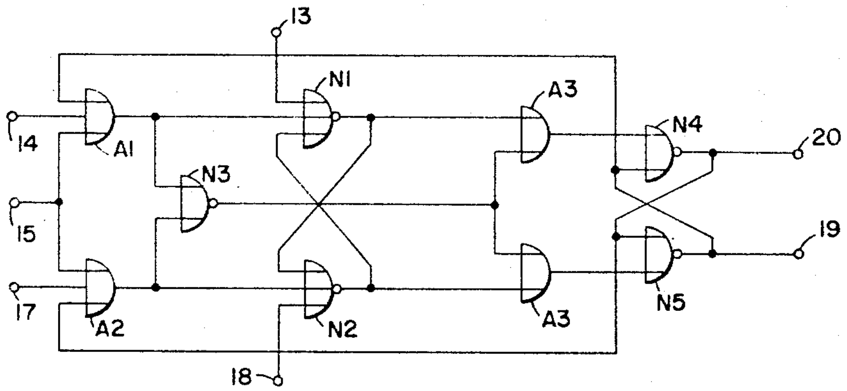
FIGURE 3 shows a schematic diagram of a special flip-flop used in FIGURES 1 and 2.

Referring to FIGURE 3, the circuit is composed of four AND gates A1, A2, A3, and A4, and five NOR gates N1–N5, connected as shown. This circuit is known in the art, and is available as integrated circuit LU320, by the Signetics Corporation. A similar circuit is shown on page 50 of the March 1966 edition of "Electronics World" magazine. As can be seen, this circuit has a plurality of terminals thereon. Terminal 14 is a "set" AND gate input terminal for A1; terminal 17 is a "reset" AND gate input terminal for A2; terminal 15 is another input terminal to AND gates A1 and A2; terminal 13 is a "pre-set" input terminal to NOR gate N1; terminal 18 is a "pre-reset" input terminal to NOR gate N2; terminal 20 is the "set" output terminal; and, terminal 19 is the "reset" output terminal.

The arrangement of the circuit is such that when a signal exists on either the "pre-set" terminal 13 or the "pre-reset" terminal 18, "set" and "reset" inputs on terminals 14, 15 and 17 are negated.

Figure 2:
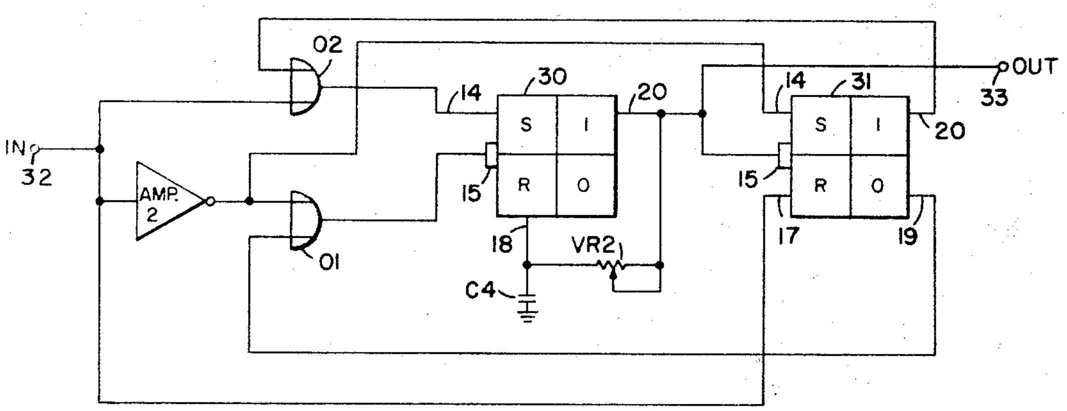
FIGURE 2 shows, in schematic form, a preferred embodiment of the invention.

Referring again to FIGURE 1, terminal 11 is the input terminal for frequencies to be doubled. Signals applied to terminal 11 will have their leading and trailing edges differentiated by the differentiators C1–R1 and C2–R2. The output of differentiator C1–R1 is inverted by an inverting amplifier AMP. 1 and passed to terminal 14 of flip-flop 10. It is to be understood that the terminal designations of the flip-flops shown in FIGURES 1 and 2 are the same as those used in FIGURE 3. An input on either terminal 13 or 14 from either differentiator will cause flip-flop 10 to change to a "set" state, if it is in a "reset" state. An output pulse then appears on "set" output terminal 20 to the circuit output terminal 12. The output pulse from 20 is also fed into a time-delay circuit composed of variable resistor VR1 and grounded capacitor C3. This time-delay circuit feeds into "pre-reset" terminal 18 of flip-flop 10, and causes the flip-flop to reset before another input on either terminal 13 or 14. Obviously, since the differentiators will provide two input pulses to "set" the flip-flop for each cycle of a square input wave, frequency doubling is achieved. The differentiators, however, do limit the frequency range of this doubler. Frequencies other than the frequencies for which the differentiators are designed would be doubled, but the output pulses would be unequally spaced. Typical values of the resistors and capacitors of FIGURE 1 are as follows:

| Element: | | Value |
|---|---|---|
| R1 | ohms | 3000 |
| R2 | do | 3900 |
| VR1 (variable) | do | 0–50,000 |
| C1, C3 | picofarads | 22 |
| C2 | do | 50 |

Turning now to the preferred embodiment of the invention as shown in FIGURE 2, it can be seen that this figure employs two flip-flops, 30 and 31. The input and output terminals are respectively designated 32 and 33. An input signal applied to terminal 32 passes through a conductor to an inverting amplifier designated AMP. 2.

The output of this amplifier is connected as an input to an OR gate designated 01. Also connected as an input to 01 is a conductor from terminal 19 of flip-flop 31. The input terminal is also connected as an input to a second OR gate, 02. Also connected as an input to 02 is a conductor from terminal 20 of flip-flop 31. The outputs of 01 and 02 are connected respectively to terminals 14 and 15 of flip-flop 30. The output terminal 20 of flip-flop 30 serves as an output for the circuit, and provides the frequency-doubled signals to output terminal 33. Terminal 20 of flip-flop 30 also is connected as an input to terminal 15 of flip-flop 31, and feeds back to its own "pre-reset" terminal 18, through a time-delay network consisting of variable resistor VR2 and grounded capacitor C4. Also, the output, AMP. 2, is connected to terminal 14 of flip-flop 31. The input signals to terminal 32 feed along a conductor to terminal 17 of flip-flop 31.

Operation of the FIGURE 2 circuit is as follows: an input signal is applied to OR gate 02, and its inversion to OR gate 01. The outputs of these OR gates are fed to the AND gate, "set" input terminals 14 and 15 of flip-flop 30. The output of flip-flop 30 is fed back through time-delay network RV2–C4 to "pre-reset" terminal 18.

Flip-flop 30 is, thus, caused to give two output pulses per input pulse, one for the leading and one for the trailing edge of the input wave. Output 20 of flip-flop 30 is also fed to terminal 15 of flip-flop 31. The "set" and "reset" terminals 19 and 20 of flip-flop 31 are fed back to the remaining inputs of OR gates 01 and 02, respectively. This provides unclamping of the input 14 and 15 of flip-flop 30, and completes the operation cycle. Capacitor C4 may be 22 picofarads, and resistor VR2 may be variable 0–50,000 ohms.

While a special flip-flop as shown in FIGURE 3 has been described as usable with the invention, obviously, a standard flip-flop, with external logic, could be used.

The preferred embodiment of the invention will double the frequency of any periodic wave shape, as long as the amplitude of the wave shape exceeds a certain level, dependent on the trigger levels of the flip-flops. Obviously, the wave shapes could be amplified, if necessary, before application to the flip-flops of the invention.

The wave shape of the output of the invention is not necessarily the same as that of the input but would consist of a series of short pulses, for one adjustment of the delay network. The delay network could be adjusted to give a square-wave output to the invention, with this square wave at double the frequency of the input wave.

While a specific embodiment of the invention has been disclosed, other embodiments may be obvious to one skilled in the art, in light of this disclosure.

The combination as shown by the invention may be applicable to fluid logic, as well as electronic.

We claim:

1. A frequency doubler for periodic waves, including: an input terminal to which said waves may be applied; a bistable circuit having inputs and an output means; inverter means; first connecting means between said input terminal and said inverter means; second connecting means between said input terminal and a first input of said bistable circuit; third connecting means between said inverter means and a second input terminal of said bistable circuit; and delay means connected between an output terminal of said bistable circuit and a third input to said bistable circuit.

2. The frequency doubler as defined in claim 1 wherein said first connecting means includes a differentiator.

3. The frequency doubler as defined in claim 1 wherein said second connecting means includes a differentiator.

4. The frequency doubler as defined in claim 1 wherein said second connecting means includes a first OR gate having first inputs and an output, with one of said first inputs connected to said input terminal, and with said output connected to said first input of said bistable circuit.

5. The frequency doubler as defined in claim 1 wherein said third connecting means includes a second OR gate having inputs and an output, with one of said inputs connected to said inverter means, and with said output connected to said second input of said bistable circuit.

6. The frequency doubler as defined in claim 1 wherein said output means of said bistable circuit includes another bistable circuit having inputs and outputs.

7. The frequency doubler as defined in claim 6 wherein said second connecting means includes a first OR gate having first inputs and a first output, with one of said first inputs connected to said input terminal, and with said first output connected to said first input of said bistable circuit; said third connecting means including a second OR gate having second inputs and a second output, with one of said second inputs connected to said inverter means, and with said second output connected to said second input of said bistable circuit.

8. The frequency doubler as defined in claim 7 wherein a first output of said second bistable circuit is connected to another input of said first OR gate; another output of said second bistable circuit is connected to another input of said second OR gate; said inverter means is connected to another input of said other bistable circuit; and said input terminal is connected to yet another input of said other bistable circuit.

References Cited

UNITED STATES PATENTS

| | | | |
|---|---|---|---|
| 2,390,608 | 12/1945 | Miller et al. | 328—38 |
| 2,589,334 | 3/1952 | Browne | 328—38 XR |

ARTHUR GAUSS, *Primary Examiner.*

JOHN ZAZWORSKY, *Assistant Examiner.*

U.S. Cl. X.R.

328—38; 307—220, 225, 271